United States Patent [19]
Tigner et al.
[11] 3,867,315
[45] Feb. 18, 1975

[54] RESINOUS COMPOSITIONS HAVING HIGH ELECTROCONDUCTIVITY CONTAINING CU AND METAL SALTS

[75] Inventors: Reuben A. Tigner, Bay City; James W. Berg, Midland, both of Mich.
[73] Assignee: The Dow Chemical Company, Midland, Mich.

[22] Filed: Feb. 12, 1973
[21] Appl. No.: 331,509

[52] U.S. Cl. .............. 252/512, 252/518, 260/37 M, 260/38, 260/39 M, 260/41 B, 260/41.5 R
[51] Int. Cl. .............. H01b 1/06
[58] Field of Search ........... 252/512, 513, 514, 515, 252/518, 519, 520, 521; 260/37 M, 38, 39 M, 41 B, 41.5 R

[56] References Cited

UNITED STATES PATENTS

| | | | |
|---|---|---|---|
| 2,687,395 | 8/1954 | Marks | 252/518 |
| 2,970,985 | 2/1961 | Guest et al. | 260/37 M |
| 3,056,750 | 10/1962 | Pass | 252/511 |
| 3,208,968 | 9/1965 | Cyba et al. | 260/37 M |
| 3,692,573 | 9/1972 | Gurwood | 252/518 X |

FOREIGN PATENTS OR APPLICATIONS

| | | | |
|---|---|---|---|
| 2,014,433 | 10/1970 | Germany | 260/39 M |

*Primary Examiner*—Richard D. Lovering
*Assistant Examiner*—R. E. Schafer
*Attorney, Agent, or Firm*—Richard G. Waterman; Michael S. Jenkins

[57] ABSTRACT

Non-conductive or poorly conductive resinous materials such as organic polymers are rendered highly conductive, e.g., volume resistivities as low as $10^{-3}$ ohm-cm, by including therein a finely divided, copper metal-containing solid and a salt such as zinc chloride. Such compositions can be fabricated into thin layers which are useful as electrodes or capacitors and into other articles wherein electroconductivity is required.

14 Claims, No Drawings

RESINOUS COMPOSITIONS HAVING HIGH ELECTROCONDUCTIVITY CONTAINING CU AND METAL SALTS

BACKGROUND OF THE INVENTION

The invention relates to highly conductive resinous compositions containing a resinous material and a finely divided conductive solid and to electroconductive articles employing such compositions.

Conductive resinous compositions, i.e., compositions formulated from a resinous binder material which has been filled with particulates of conductive materials such as carbon black, metals such as copper and silver, and the like have been widely used as electrical cable jacketings, electrical resistors, in heating elements and printed circuits as electrodes for capacitors, as conductive adhesives and so forth. See, for example, U.S. Pat. Nos. 3,412,358; 3,056,750; 3,359,145; 2,165,738 and 3,185,908.

Unfortunately, in order to achieve even moderate degrees of conductivity, i.e., resistances less than 1 ohm-cm, required in many applications, it has been necessary to incorporate as much as 75 weight percent of the conductive particulate based on the resinous binder. At such levels of the conductive filler, the ease of fabrication and the overall strength of the conductive composition are often reduced to the point that they are either not acceptable or are marginally so for the intended use. Some high degrees of conductivity, i.e., less than 0.1 ohm-cm, cannot be practically achieved by conventional incorporation of a conductive particulate into a resinous binder.

Therefore, it would be highly desirable to provide a resinous composition having moderate or high degrees of conductivity at levels of conductive particulate much lower than those required in prior art conductive compositions.

SUMMARY OF THE INVENTION

The present invention is, in one aspect, a resinous composition comprising non-conductive or semiconductive resinous material as the matrix of the composition having dispersed therein a finely divided, copper metal-containing solid and a salt as specified hereinafter, said salt and copper metal-containing solid being present in amounts sufficient to render the composition electroconductive.

In another aspect, the invention is an article containing the resinous composition as an electroconductive component. An exemplary article is a capacitor having as essential components at least two electrodes comprising the resinous composition insulated from each other by a dielectric material and electrical leads connecting to the electrodes. Also included are articles such as electrical storage batteries; inductors for electrical motors, transformers and coils; printed circuit boards for electrical systems such as radio, television, telephone and teletype systems, and computers; conductive or resistive coatings or encapsulated layers for electrical blankets, heating pads, heated walls and floors, electrical precipitators and faraday cages; electrical wiring such as television lead-in wiring, communication cables, and resistive wiring for spark plugs; molded terminal sockets for light fixtures, electrical outlets, fuse panels and integrated circuit sockets; terminals with fuse properties; and antistatic films and fibers wherein the resinous composition of the present invention serves as the electroconductive component or components.

DETAILED DESCRIPTION OF THE PREFERRED EMBODIMENTS

The resinous matrix of the present invention is suitably any poorly conductive resinous material capable of serving as a binder for finely divided metals. For the purposes of this invention, the term "resinous materials" means solid or semi-solid materials derived from natural products (so-called natural resins) and those produced by polymerization (so-called synthetic resins). By "poorly conductive" is meant that the resinous materials may be non-conductive materials having volume resistivities in the order of $10^{14}$ ohm-cm as those commonly employed as dielectric materials in many electrical applications or they may be semi-conductive such as those materials commonly employed as electroconductive paper coatings and the like having volume resistivities in the range of $10^6$–$10^9$ ohm-cm. Preferably, the resinous material is a normally solid or semisolid, thermoplastic polymer, especially one which can be readily fabricated by normal extrusion and molding methods. It is understood, however, that thermosetting polymers are also suitable.

Exemplary preferred polymers include the organic addition polymers of the following monomers: aliphatic $\alpha$-monoolefins such as ethylene, propylene, butene-1, and isobutene; vinyl halides such as vinyl chloride, vinyl bromide and vinylidene chloride; esters of $\alpha,\beta$-ethylenically unsaturated carboxylic acids such as ethyl acrylate, methyl methacrylate, hydroxyethyl acrylate and diethyl maleate; $\alpha,\beta$-ethylenically unsaturated carboxylic acids such as acrylic acid, methacrylic acid, maleic anhydride, itaconic acid and fumaric acid; monovinylidene aromatic carbocyclic monomers such as styrene, $\alpha$-methyl styrene, ar-chlorostyrene, ar-(t-butyl)-styrene and vinyl benzyl quaternary ammonium compounds; conjugated dienes such as butadiene and isoprene; ethylenically unsaturated nitriles, amines, ethers, ketones and other ethylenically unsaturated compounds such as acrylonitrile, vinyl pyridine, ethyl vinyl ether and methyl vinyl ketone. Also suitable are the cellulosic polymers such as methyl cellulose and ethyl cellulose, polyamines such as polyethyleneimine, polyamides such as nylon, polyesters such as poly(ethylene terephthalate), polycarbonates and the like. Also, non-organic polymers as the silicone rubbers are suitable resinous materials. Especially preferred resinous materials are the ethylene polymers such as polyethylene, ethylene/vinyl acetate copolymer, ethylene/acrylic acid copolymer and ethylene/butene-1 copolymers, halogen-containing polymers such as polyvinyl chloride, polyvinylidene chloride, vinylidene chloride copolymers including such other monomers as vinyl chloride and acrylonitrile, and chlorinated polyethylene.

In addition to the foregoing polymers, the natural resins such as rosin, pine tar and the like also may be suitably employed as resinous materials.

The metal component employed in the practice of this invention is suitably any finely divided, copper metal-containing solid, preferably one having an average particle size in the range from about 0.01 to about 150 microns, especially from about 1 to about 15 microns. In addition to metal particles composed entirely of copper, metal alloys containing copper and other metals such as zinc, aluminum, bismuth, silver, iron, nickel, and gold are also suitable. When the distribution of copper is uniform throughout the metal particles as in an alloy, the copper should constitute at least about 50 volume percent, preferably at least about 70 volume percent of the metal particles. Especially preferred are copper and metal alloys containing at least 90 volume percent copper and up to about 10 volume percent of zinc such as brass and bronze. The proportion of copper in the metal particulate can be reduced to a minimum of 10 volume percent of the particulate by plating copper on the surface of a particulate of another conductive metal such as iron, silver, gold and the like, e.g., as shown in U.S. Pat. No. 3,476,530 to Ehrreich et al. or by depositing the copper on a particulate of a non-conductive resinous material by conventional metallizing techniques. Resinous materials suitable for this purpose are described hereinbefore. In such cases including plating or metallization, the copper should form an essentially continuous layer covering the particle surfaces of the particulate.

The salt employed in the conductive polymeric composition is suitably any chloride, bromide, bicarbonate, tetraborate or carboxylate of metals such as, the alkali metals, calcium, zinc, silver, copper and lead. Also suitable are the fluorides of sodium and potassium. Exemplary salts include sodium chloride, sodium fluoride, potassium bromide, sodium bromide, potassium chloride, sodium tetraborate, lithium chloride, lithium bromide, sodium bicarbonate, sodium acetate, sodium benzoate, zinc chloride, zinc bromide, zinc acetate, zinc stearate, calcium chloride, lead (II) chloride, silver chloride, cupric chloride and the like. Generally the carboxylates have from 1 to 20, preferably from 2 to 12, carbon atoms and include aliphatic and aromatic varieties. Exemplary carboxylates include the acetates, benzoates, laurates and stearates of the aforementioned metals. Preferably, the salt is zinc chloride. The salt is advantageously employed at particle size less than about 150 microns, preferably less than 5 microns.

In the conductive composition, the resinous material is used in sufficient amount to act as a continuous or semi-continuous phase thereby serving as a binder for the metal component and the salt. The metal component and salt are used in amounts sufficient to render the composition electroconductive. For the purposes of this invention, a composition is considered to be electroconductive if the volume resistivity of the composition is less than $10^4$ ohm-cm. Preferably, in order to obtain an easily fabricated, economical material, the copper-containing solid constitutes from about 4 to about 50, especially from about 7 to about 15, volume percent of the composition, and the salt constitutes from about 0.03 to about 5, especially from about 0.1 to about 3 volume percent of the composition.

The conductive compositions are suitably prepared by incorporating the metal particulate and salt into the polymer by conventional polymer blending or mixing techniques such as roll milling, extrusion, kneading, dry blending or tumbling and the like wherein sufficient heat is employed to achieve the desired conductivity. Temperatures in the range from about 300° to about 600°F, preferably from about 350° to about 475°F, and residence times in the range from a few seconds to about an hour, preferably from about 1 to about 10 minutes, are advantageously employed. Alternatively, mixing or blending techniques may be carried out at lower temperatures in which case the compositions are subsequently activated by applying sufficient heat during or after fabrication.

In the fabrication of the conductive composition into thin layers, particularly into thin layered capacitors or printed circuits, the conductive material is coextruded with dielectric materials using a coextrusion apparatus as disclosed in U.S. Pat. No. 3,557,265 of Chisholm et al. to form a multilayer structure wherein two or more conductive layers are insulated from each other by layers of dielectric material. The thicknesses of layers that can be achieved by this technique range from about 0.004 to about 50 mils, especially from about 0.1 to about 30 mils. Exemplary dielectric materials which are suitably employed are non-conductive, resinous materials as described hereinbefore including normally solid, organic polymers and blends of such polymers and inorganic dielectric materials such as barium titanate, strontium zirconate, titanium dioxide, calcium titanate, strontium titanate, barium zirconate, magnesium zirconate, calcium zirconate and other known dielectric materials. In the manufacture of capacitors, it is desirable to modify the coextrusion apparatus so that consecutive layers of the electroconductive composition are offset. In the resulting multi-layer capacitor, alternating layers of the electroconductive composition can be connected to an electrical lead wire which is insulated from the next adjacent layers of the electroconductive composition.

Fabrication of the conductive resinous materials into other articles as described hereinbefore is carried out using conventional apparatus and techniques for fabricating the particular resinous material in the non-conductive state. Exemplary fabrication methods include molding such as injection and compression molding, extrusion, die casting and the like.

The following example is given to illustrate the invention and should not be construed as limiting its scope. All parts and percentages are by weight unless otherwise indicated.

EXAMPLE

Several blends are prepared using a blend of polyethylene and ethylene/vinyl acetate copolymer as the resinous material and metals and salts as identified in Table I by mixing the foregoing ingredients on a roll compounding apparatus at 266°F until a uniform mixture of the metal powder and salt in the polymer is achieved. The blends are molded into test tabs (4 inches × 4 inches × 0.02 inches) by pressing the samples of the blends between two plates and heating at 475°F for 5 minutes. The volume resistivities of the resultant test tabs are measured and the results are recorded in Table I.

For the purposes of comparison, two control samples ($C_1$ and $C_2$) are prepared by the foregoing procedure except that no salt is added. The volume resistivities of the control samples are measured, and the results are recorded in Table I.

TABLE I

| Sample No. | Amount of Polymer (1) Wt. Parts | Metal (3) Type | Metal (3) Amount Vol. Parts | Metal (3) Amount Wt. Parts | Salt (3) Type | Salt (3) Amount Vol. Parts | Salt (3) Amount Wt. Parts | Volume Resistivity (2) ohm-cm |
|---|---|---|---|---|---|---|---|---|
| 1 | 47.1 | Brass(a) | 10 | 50.0 | $ZnBr_2$ | 0.7 | 2.9 | 0.010 |
| 2 | 40.1 | do. | 10 | 50.0 | Zn Stearate | — | 9.9 | 0.013 |
| 3 | 47.1 | do. | 10 | 50.0 | $ZnCl_2$ | 1 | 2.9 | 0.006 |
| 4 | 45 | Copper(b) | 10 | 50.0 | AgCl | 0.9 | 5.0 | 4.80 |
| 5 | 47.1 | do. | 10 | 50.0 | $ZnCl_2$ | 1 | 2.9 | 0.06 |
| 6 | 45 | do. | 10 | 50.0 | NaCl | 1.5 | 5.0 | 0.208 |
| 7 | 45 | do. | 10 | 50.0 | $CuCl_2$ | 1.5 | 5.0 | 62.0 |
| 8 | 45 | do. | 10 | 50.0 | $LiBr_2$ | 1.4 | 5.0 | 0.015 |
| 9 | 45 | do. | 10 | 50.0 | KBr | 1.8 | 5.0 | 114.0 |
| 10 | 45 | do. | 10 | 50.0 | NaBr | 1.6 | 5.0 | 225.0 |
| 11 | 45 | do. | 10 | 50.0 | KCl | 2.5 | 5.0 | 0.185 |
| 12 | 45 | do. | 10 | 50.0 | Zn Acetate | 2.7 | 5.0 | 0.243 |
| 13 | 45 | do. | 10 | 50.0 | $CaCl_2$ | 2.3 | 5.0 | 0.043 |
| 14 | 45 | do. | 10 | 50 | $PbCl_2$ | 0.85 | 5.0 | 0.028 |
| 15 | 45 | do. | 10 | 50 | LiCl | 2.4 | 5.0 | 0.014 |
| $C_1$* | 50 | do. | 10 | 50 | — | | | Non-Conductive |
| $C_2$* | 50 | Brass | 10 | 50 | — | | | Non-Conductive |

*Not an example of this invention
(a) Brass - alloy of 90% copper and 10% zinc having an average particle size in the range of 5-12 microns
(b) Copper - copper particulate of 99.9% purity having an average particle size in the range of 5-12 microns
(1) Polymer - blend of two weight parts of polyethylene (density=0.921 g/cc and MI=3 decig/min) per one weight part of ethylene/vinyl acetate (72/28) copolymer
(2) determined by ASTM D-991
(3) Composition is prepared using weight parts of the components. Volume parts are calculated from weight parts and are approximate values.

Results similar to the ones shown in Table I are obtained when high density polyethylene, polypropylene, polystyrene and other resinous materials as described hereinbefore are substituted for the polymer blend employed in the foregoing Example. Also it is found that compositions containing different amounts of the copper-containing solid and salt within the ranges of about 4 to about 50 volume percent and about 0.03 to about 5 volume percent, respectively, have conductivities suitable for the purposes of this invention.

What is claimed is:

1. An electroconductive resinous composition comprising a resinous material having a volume resistivity greater than $10^6$ ohm-cm as the matrix having dispersed therein a finely divided, copper metal-containing solid wherein copper metal constitutes at least 50 volume percent of the solid if copper metal is distributed throughout the solid and at least 10 volume percent if the copper metal forms an essentially continuous layer covering the particle surfaces of the solid and a salt selected from the group consisting of chlorides, bromides, bicarbonates, tetraborates and carboxylates of the alkali metals, calcium, zinc, lead, silver, and copper and the fluorides of sodium and potassium, said solid and salt being present in amounts sufficient to reduce the volume resistivity of said composition below $10^4$ ohm-cm.

2. The composition of claim 1 wherein the amount of said solid is within the range from about 4 to about 50 volume percent and the amount of the salt is within the range from about 0.03 to about 5 volume percent, both percentages being based on the volume of the composition.

3. The composition of claim 1 wherein the solid contains at least 70 volume percent copper.

4. The composition of claim 3 wherein the solid is a metallic solid comprising at least 90 volume percent copper and up to about 10 volume percent zinc.

5. The composition of claim 1 wherein the solid has an average particle size in the range from about 0.01 to about 150 microns.

6. The composition of claim 1 wherein the salt is a zinc chloride.

7. The composition of claim 1 wherein the salt is zinc bromide.

8. The composition of claim 1 wherein the salt is a carboxylate having 1 to 20 carbon atoms.

9. The composition of claim 1 wherein the resinous material is a normally solid, thermoplastic polymer.

10. The composition of claim 9 wherein the polymer is an polymer of an aliphatic α-monoolefin.

11. The composition of claim 10 wherein the polymer is a blend of polyethylene and an ethylene/vinyl acetate copolymer.

12. The composition of claim 1 comprising a resinous material as the matrix selected from the group consisting of normally solid thermoplastic polymers of aliphatic α-monoolefins, vinyl halides, esters of α,β-ethylenically unsaturated carboxylic acids, α,β-ethylenically unsaturated carboxylic acids, monovinylidene aromatic carbocyclic monomers, conjugated dienes, ethylenically unsaturated nitriles, ethylenically unsaturated amines, ethylenically unsaturated ethers, and ethylenically unsaturated ketones, cellulosic polymers, polyamines, polyamides, polyesters, polycarbonates and silicone rubbers having dispersed therein a finely divided, copper metal-containing solid having an average particle size in the range from about 0.01 to about 150 microns and selected from the group consisting of copper and metal alloys of copper and zinc, aluminum, bismuth, silver, iron, nickel or gold and said salt of claim 1, said copper metal-containing solid and salt being present in amounts sufficient to reduce the volume resistivity of said composition below $10^4$ ohm-cm.

13. The composition of claim 1 comprising a resinous material as the matrix selected from the group consisting of normally solid, thermoplastic polymers of ethylene, propylene, butene-1, isobutene, vinyl chloride, vinylidene chloride, ethyl acrylate, methyl methacrylate, styrene, α-methyl-styrene, ar-(t-butyl)styrene, vinyl benzyl quarternary ammonium compounds, butadiene, isoprene, acrylonitrile, vinyl pyridine, and methyl vinyl ketone; polymers of ethyl cullulose and methyl cellulose; polyethyleneimine; nylon, and poly(ethylene terephthalate) having dispersed therein from about 4 to about 50 volume percent based on the composition of a particulate solid of copper or a metal alloy of at least 70 volume percent copper and the remainder of zinc, aluminum, bismuth, silver, iron, nickel or gold, said particulate solid having an average particle size from about 0.01 to 150 microns and from about 0.03 to about 5 volume percent based on the composition of said salt of Claim 1 provided that said copper-metal containing solid and salt are present in amounts sufficient to reduce the volume resistivity of said composition below $10^4$ ohm-cm.

14. The composition of claim 1 comprising a resinous material as matrix selected from the group consisting of polyethylene, ethylene/vinyl acetate copolymer, ethylene/acrylic acid copolymer, ethylene/butene-1 copolymer, polyvinyl chloride, polyvinylidene chloride, vinyl chloride/vinylidene chloride copolymer, vinylidene chloride/acrylonitrile copolymer and chlorinated polyethylene having dispersed therein from about 4 to about 50 volume percent based on the composition of copper or brass in the form of a particulate solid having an average particle size of from about 1 to 15 microns and from about 0.1 to about 3 volume percent based on the composition of a salt selected from the group consisting of zinc bromide, zinc chloride, zinc stearate, zinc acetate, sodium chloride, lithium bromide, potassium chloride, calcium chloride, lead (II) chloride and lithium chloride, provided that said particulate solid and salt are present in amounts sufficient to reduce the volume resistivity of said composition to $10^{-1}$ ohm-cm.

* * * * *